United States Patent
Chu et al.

(10) Patent No.: US 9,260,157 B2
(45) Date of Patent: Feb. 16, 2016

(54) FRAME ADAPTED TO A PEDELEC

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Wen-Sung Chu, Taoyuan (TW); An-Yi Ma, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 0 days.

(21) Appl. No.: 14/447,637

(22) Filed: Jul. 31, 2014

(65) Prior Publication Data

US 2015/0367911 A1     Dec. 24, 2015

(30) Foreign Application Priority Data

Jun. 23, 2014   (TW) .............................. 103121623 A

(51) Int. Cl.
*B62M 6/90*   (2010.01)
*B62M 6/45*   (2010.01)
*B62K 3/02*   (2006.01)

(52) U.S. Cl.
CPC .. *B62M 6/90* (2013.01); *B62K 3/02* (2013.01); *B62M 6/45* (2013.01)

(58) Field of Classification Search
CPC .............. B62K 3/02; B62M 6/90; B62M 6/45
See application file for complete search history.

(56) References Cited

U.S. PATENT DOCUMENTS

| | | | | | |
|---|---|---|---|---|---|
| 4,410,060 | A | * | 10/1983 | Cunard | 180/206.4 |
| 5,474,148 | A | * | 12/1995 | Takata | 180/206.2 |
| 5,570,752 | A | * | 11/1996 | Takata | 180/206.4 |
| 5,789,898 | A | * | 8/1998 | Suzuki et al. | 320/104 |
| 5,806,621 | A | * | 9/1998 | Soda et al. | 180/206.4 |
| 6,016,882 | A | * | 1/2000 | Ishikawa | 180/207.3 |
| 6,247,548 | B1 | * | 6/2001 | Hayashi et al. | 180/206.2 |
| 6,276,479 | B1 | * | 8/2001 | Suzuki et al. | 180/206.8 |
| 6,629,574 | B2 | * | 10/2003 | Turner | 180/206.4 |
| 9,051,020 | B2 | * | 6/2015 | Lo | |
| 2010/0117327 | A1 | * | 5/2010 | Hadley | 280/214 |
| 2010/0252345 | A1 | * | 10/2010 | Hoshino | 180/65.31 |
| 2011/0025266 | A1 | * | 2/2011 | Li et al. | 320/109 |
| 2011/0048831 | A1 | * | 3/2011 | Tsai | 180/219 |
| 2011/0240391 | A1 | * | 10/2011 | Bonneville | 180/220 |
| 2011/0272203 | A1 | * | 11/2011 | Sugimoto et al. | 180/206.1 |
| 2011/0278086 | A1 | * | 11/2011 | Cho | 180/220 |
| 2011/0284302 | A1 | * | 11/2011 | Chiu | 180/220 |

(Continued)

*Primary Examiner* — Gabriela C Craciun

(74) *Attorney, Agent, or Firm* — Winston Hsu; Scott Margo

(57) ABSTRACT

A frame includes a frame body, a control unit, a first connector, a battery module and a second connector. The frame body has a receiving space formed therein, a first tube and a second tube. The first tube is combined with the second tube at a conjunction. An installed space is defined between the first tube and the second tube. An opening is formed on the conjunction, and the receiving space communicates with the installed space through the opening. The control unit is disposed within the receiving space. The first connector is disposed in the opening and coupled to the control unit. The battery module is detachably installed in the installed space. The second connector is disposed on the battery module and for engaging with the first connector when the battery module is installed in the installed space.

21 Claims, 7 Drawing Sheets

(56) References Cited

U.S. PATENT DOCUMENTS

| | | | |
|---|---|---|---|
| 2012/0043148 A1* | 2/2012 | Brady et al. | 180/206.5 |
| 2012/0145852 A1* | 6/2012 | Chiang | 248/224.8 |
| 2013/0068549 A1* | 3/2013 | Laprade | 180/206.1 |
| 2013/0233631 A1* | 9/2013 | Jauvtis | 180/206.4 |
| 2014/0081494 A1* | 3/2014 | Chun et al. | 701/22 |
| 2014/0121877 A1* | 5/2014 | Hosaka et al. | 701/22 |
| 2014/0367941 A1* | 12/2014 | Bez | 280/259 |
| 2015/0114734 A1* | 4/2015 | Ogawa | 180/68.5 |
| 2015/0122562 A1* | 5/2015 | Miyashiro | 180/68.5 |
| 2015/0122563 A1* | 5/2015 | Kondo et al. | 180/68.5 |
| 2015/0149006 A1* | 5/2015 | Han et al. | 701/22 |

* cited by examiner

FRAME ADAPTED TO A PEDELEC

BACKGROUND OF THE INVENTION

1. Field of the Invention

The present invention relates to a frame of a bicycle, and more particularly, to a frame adapted to a pedelec.

2. Description of the Prior Art

Recently, a pedelec is equipped with a battery module for providing the pedelec with an extra power for facilitating the user to overcome paths with different situations when a user rides the pedelec. Generally speaking, the battery module of the pedelec is secured behind the saddle member and incapable of detaching from the pedelec, which leads to inconvenience of containing. In addition, the structure that the battery module is fixed behind the saddle member affects appearance of the pedelec, resulting in lacking for unity of the appearance of the pedelec.

SUMMARY OF THE INVENTION

The present invention provides a frame with convenience of containing and unity of the appearance for solving above drawbacks.

According to an embodiment of the present invention, a frame adapted to a pedelec with a rear wheel and a saddle member includes a frame body, a control unit, a first connector, a battery module and a second connector. The frame body is substantially a Y-shaped structure and a receiving space is formed in the frame body. The frame body includes a first tube coupled to the saddle member and a second tube coupled to the rear wheel. The first tube is combined with the second tube at a conjunction. An installed space is defined between the first tube and the second tube, and an opening is formed on the conjunction, and the receiving space communicates with the installed space through the opening. The control unit is disposed within the receiving space. The first connector is disposed within the opening and coupled to the control unit. The battery module is detachably installed in the installed space. The second connector is disposed on the battery module and corresponds to the first connector. When the battery module is installed in the installed space, the second connector is engaged with the first connector such that the battery module is electrically coupled to the control unit.

According to another embodiment of the present invention, a frame adapted to a pedelec includes a frame body, a first connector, a battery module, a second connector, a first combining member and a second combining member. The frame body is a substantially Y-shaped structure. The frame body includes a first tube and a second tube. The first tube extends above the second tube, an installed space is defined between a lower surface of the first tube and an upper surface of the second tube, and the first tube has a front end and a rear end. The first connector is disposed on the frame body. The battery module is detachably installed in the installed space. The second connector is disposed on the battery module and corresponds to the first connector. The second connector is coupled to the first connector when the battery module is installed in the installed space. The first combining member is disposed on the lower surface of the first tube. The second combining member is disposed on the battery module and corresponds to the first combining member. The second combining member mates with the first combining member, such that the battery module moves relative to the first tube along a front-to-rear movement path. When the battery module moves along a direction from the rear end toward the front end, the battery module is installed in the installed space. When the battery module moves along a direction from the front end toward the rear end, the battery module detaches from the installed space.

In summary, the installed space formed between the first tube and the second tube is utilized for containing the battery module, and the control unit is disposed within the receiving space in the frame body. Thus, when the battery module is installed on the frame body, the battery module does not affect the appearance of the pedelec. Furthermore, the first combining member and the second combining member of the present invention are utilized for installing the battery module onto the frame body in a detachable manner. Thus, when the battery module is not in use, the battery module is capable of being detached from the pedelec for enhance containing convenience.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention maybe practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments maybe utilized and structural changes maybe made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
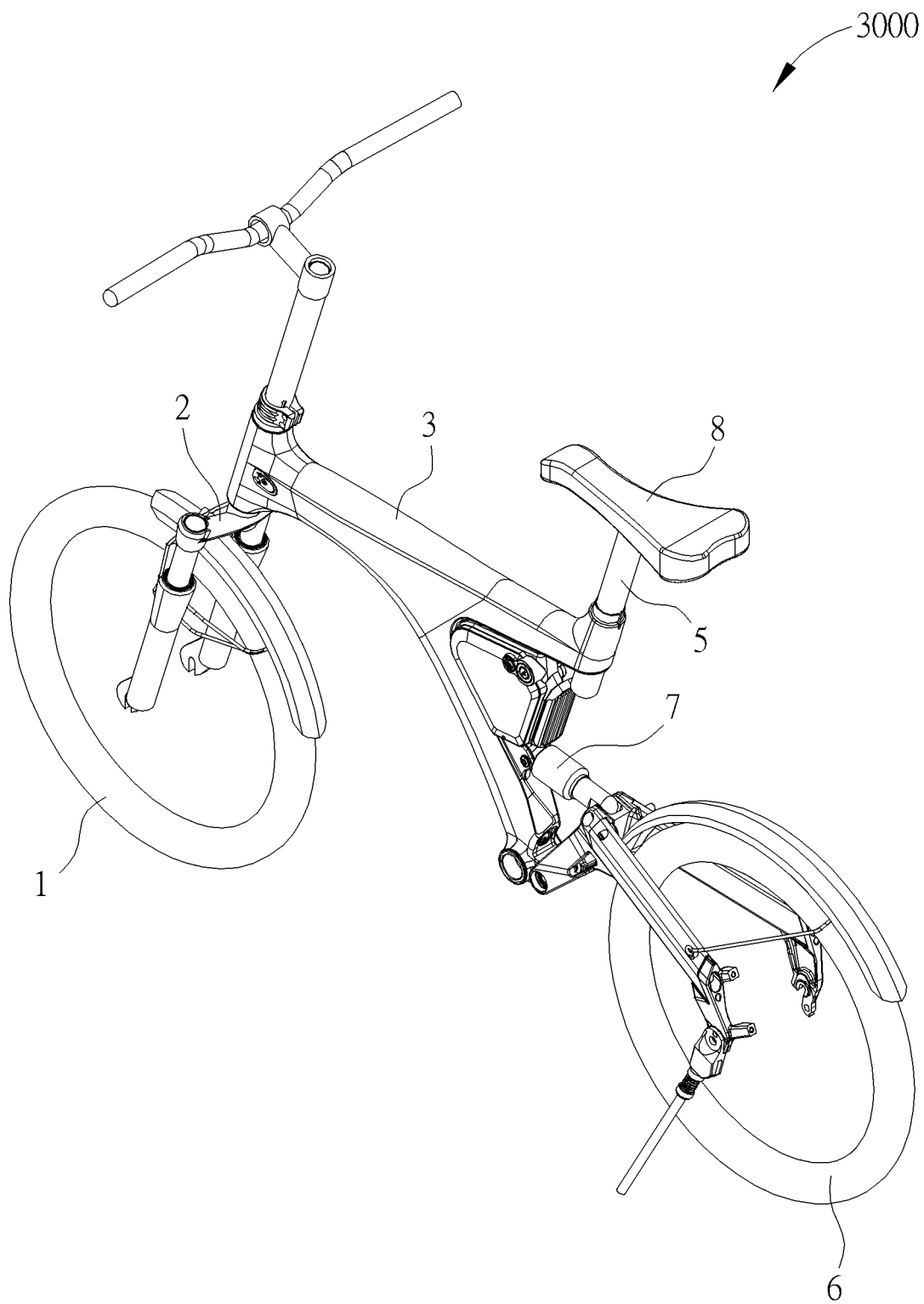
FIG. 1 is a schematic diagram of a pedelec according to an embodiment of the present invention.

Please refer to FIG. 1. FIG. 1 is a schematic diagram of a pedelec 3000 according to an embodiment of the present invention. As shown in FIG. 1, the pedelec 3000 includes a front wheel 1, a front fork mechanism 2, a frame 3, a seat tube 5, a rear wheel 6, a suspension mechanism 7 and a saddle member 8. The front fork mechanism 2 connects the front wheel 1 and the frame 3 and is used for absorbing vibration transmitted by the front wheel 1 when the pedelec 3000 is proceeding. The suspension mechanism 7 connects the rear wheel 6 and the frame 3 and is used for absorbing vibration transmitted by the rear wheel 6 when the pedelec 3000 is proceeding. Accordingly, the front wheel 1 and the rear wheel 6 stably move the frame 3. The saddle member 8 is installed on the frame 3 by the seat tube 5 for allowing a user to be seated.

Figure 2:
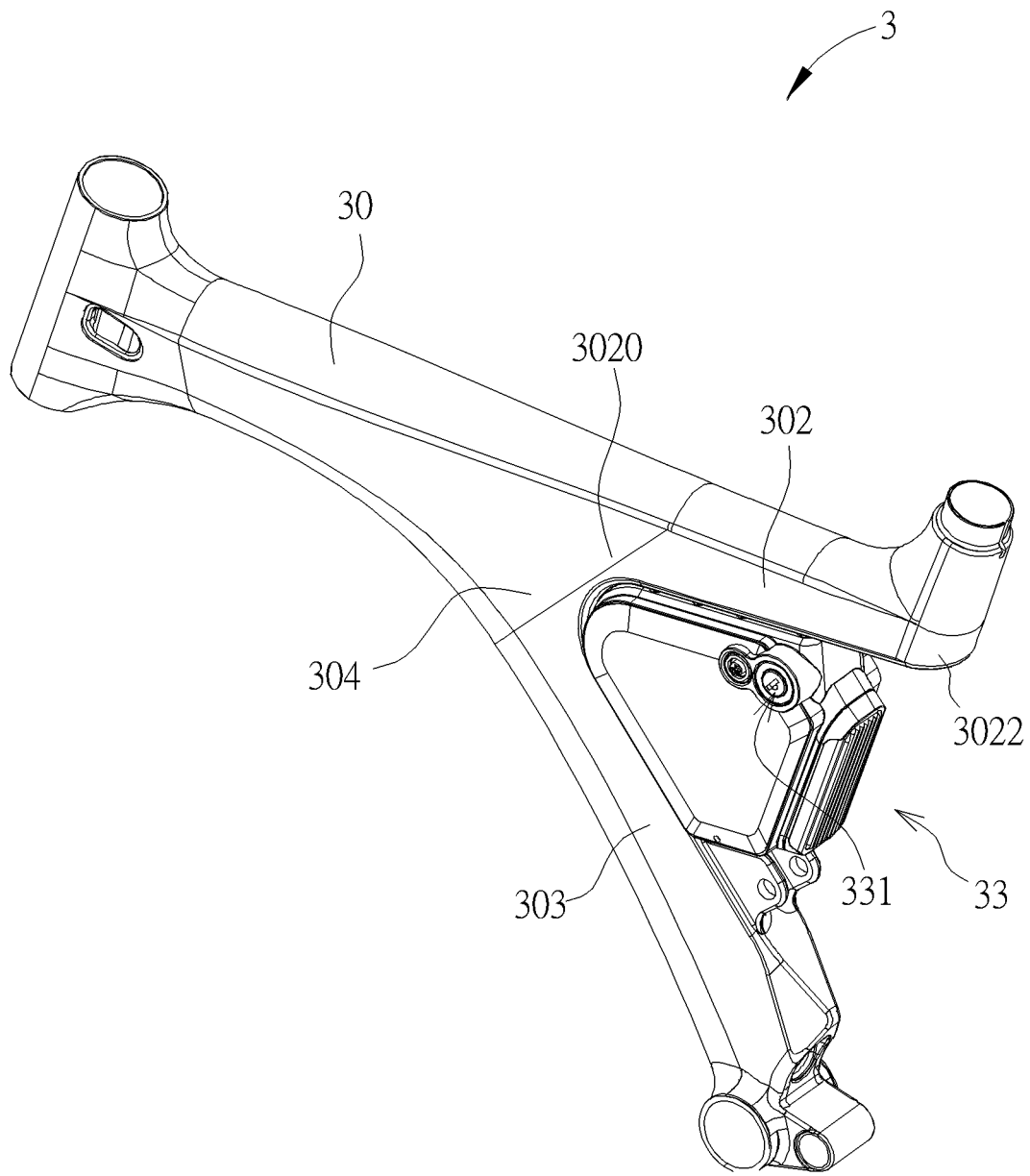
FIG. 2 is a diagram of a frame according to the embodiment of the present invention.
Figure 3:
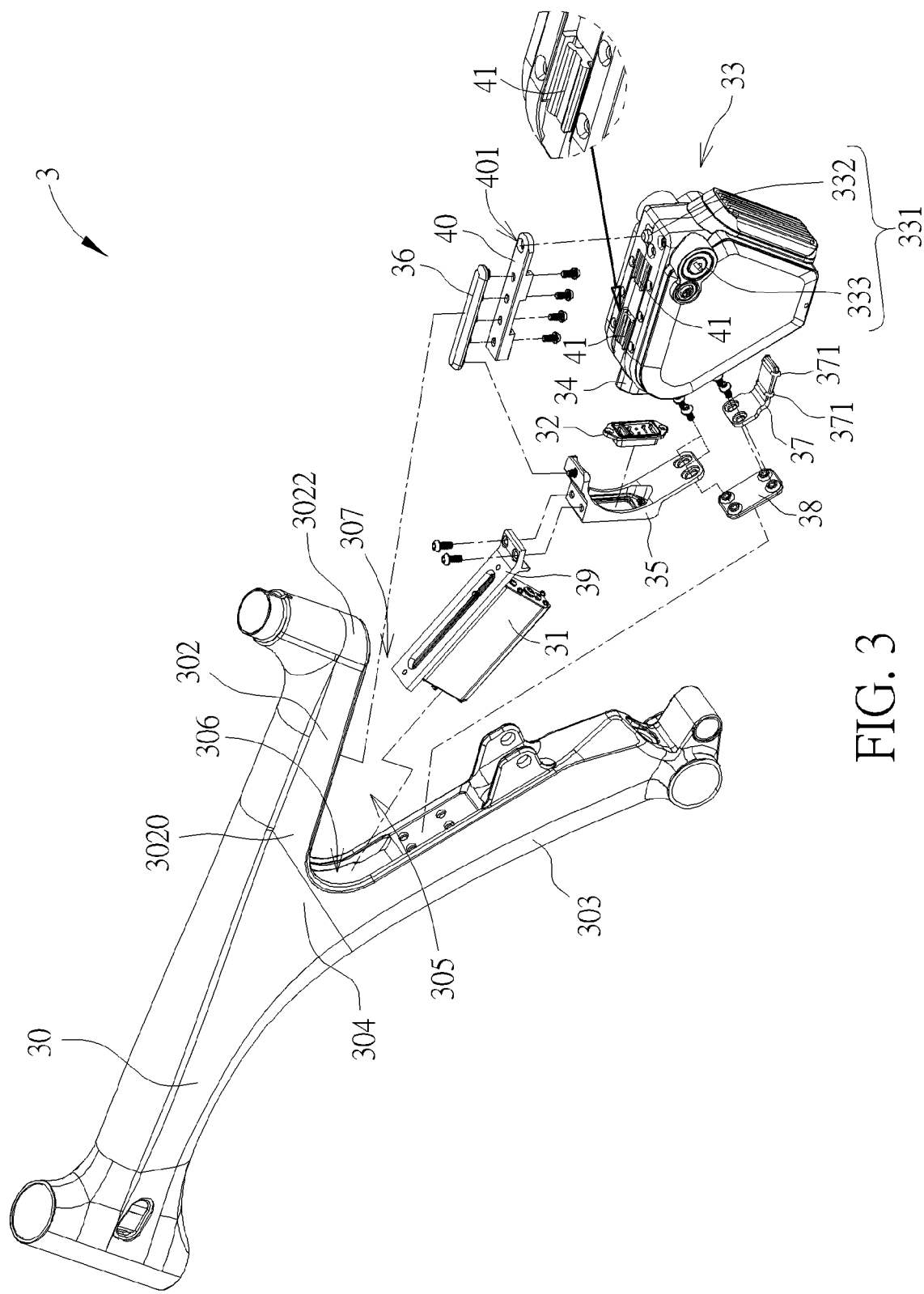
FIG. 3 is an exploded diagram of the frame according to the embodiment of the present invention.
Figure 4:
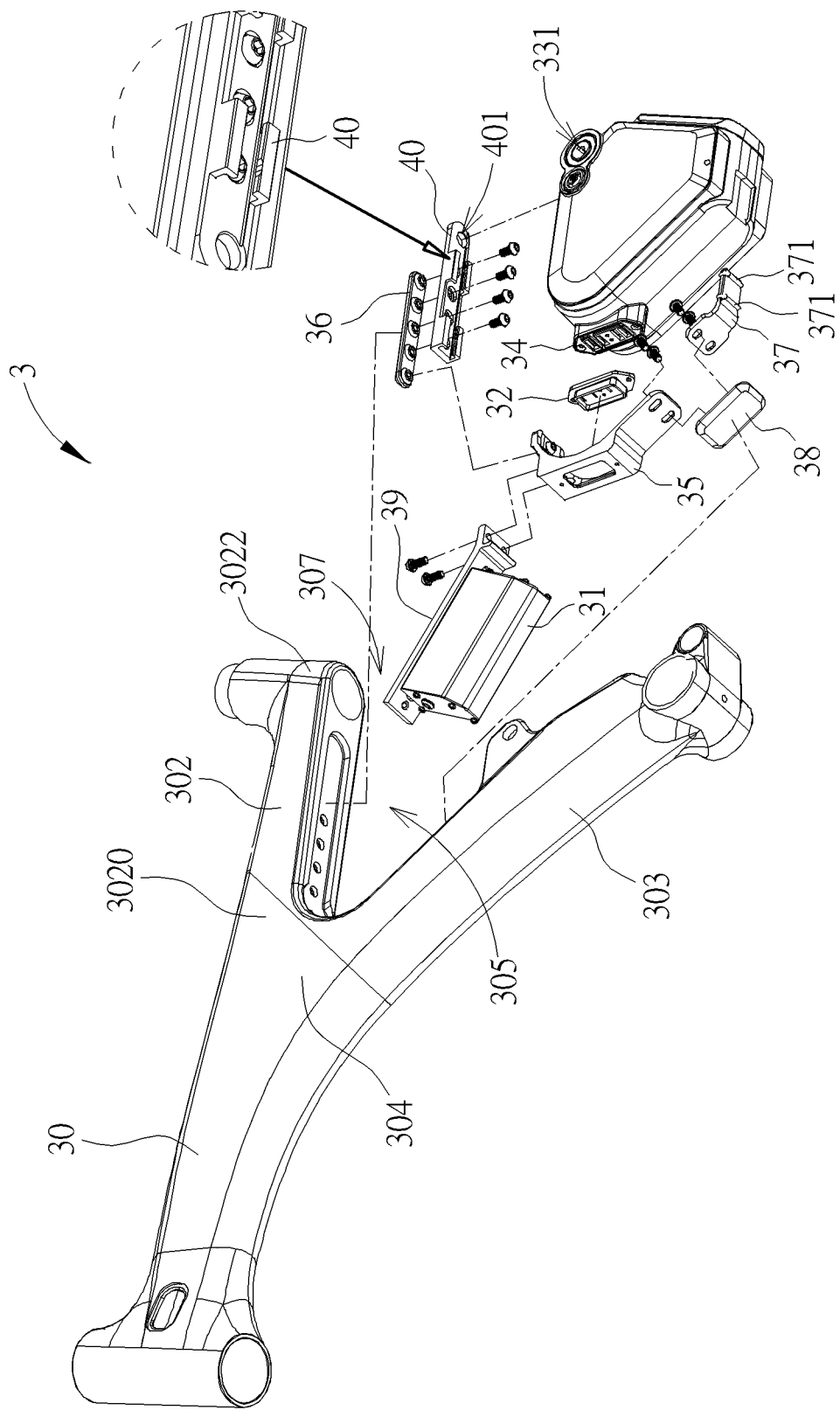
FIG. 4 is an exploded diagram of the frame in another view according to the embodiment of the present invention.
Figure 5:
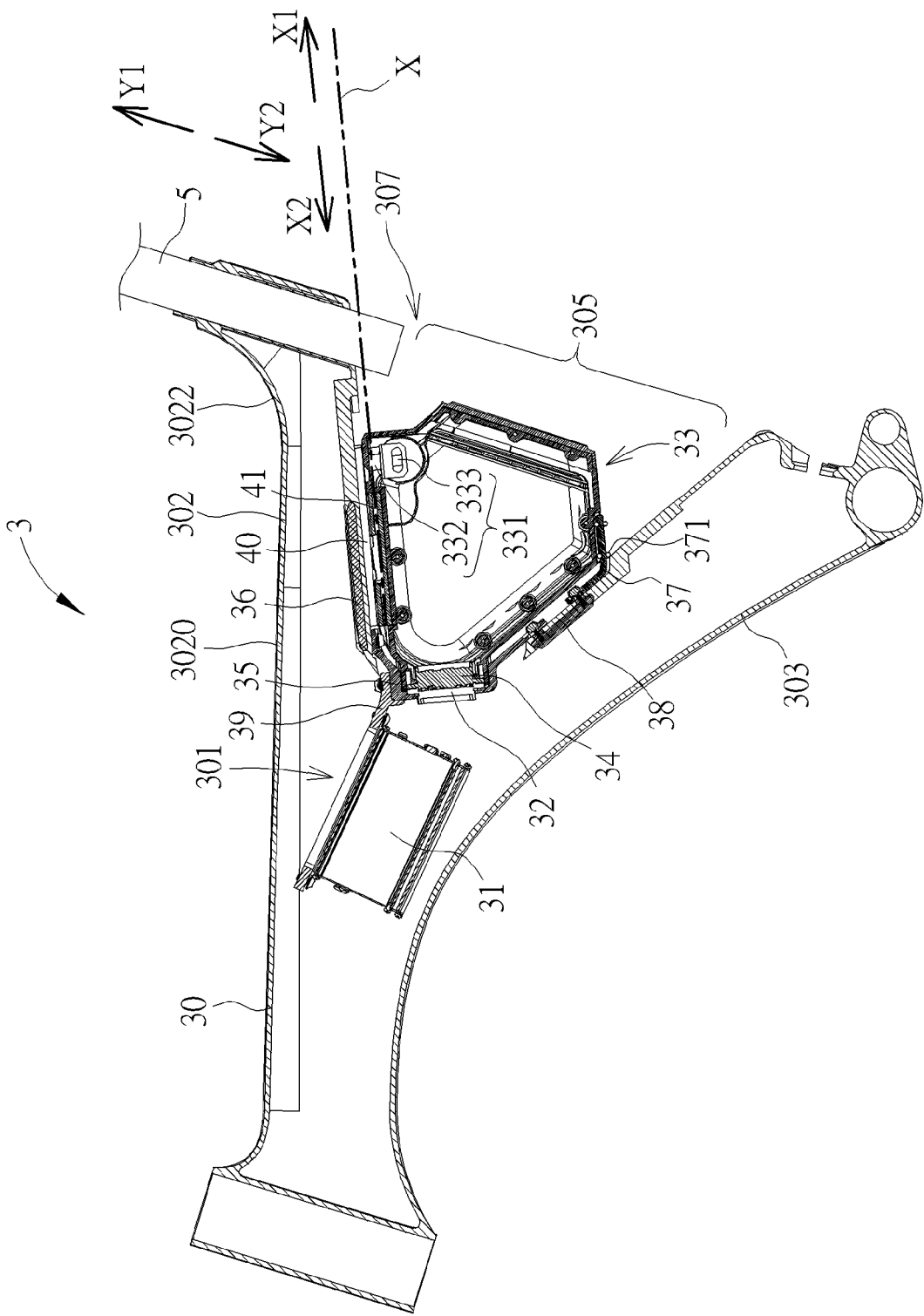
FIG. 5 is a sectional diagram of the frame according to the embodiment of the present invention.

Please refer FIG. 2 to FIG. 5. FIG. 2 is a diagram of the frame 3 according to the embodiment of the present invention. FIG. 3 is an exploded diagram of the frame 3 according to the embodiment of the present invention. FIG. 4 is an exploded diagram of the frame 3 in another view according to the embodiment of the present invention. FIG. 5 is a sectional diagram of the frame 3 according to the embodiment of the present invention. As shown in FIG. 2 to FIG. 5, the frame 3 includes a frame body 30, a control unit 31, a first connector 32, a battery module 33, a second connector 34, a connector base 35, a first connecting member 36, a holding member 37, a second connecting member 38, a controller base 39, a first combining member 40 and a second combining member 41. A receiving space 301 is formed in the frame body 30, and the frame body 30 includes a first tube 302 and a second tube 303. The first tube 302 is coupled to the saddle member 8, and the second tube 303 is coupled to the rear wheel 6 by the suspension mechanism 7. The first tube 302 is combined with the second tube 303 at a conjunction 304. Furthermore, an installed space 305 is defined between a lower surface of the first tube 302 and an upper surface of the second tube 303, and an opening 306 is formed on the conjunction 304 and the receiving space 301 communicates with the installed space 305 through the opening 306. An exit opening 307 is formed on a side of the installed space 305, and the battery module 33 is installed into the installed space 305 via the exit opening 307.

In this embodiment, the frame body 30, the first tube 302 and the second tube 303 are integrally formed, but the present invention is not limited thereto. For example, the frame body 30, the first tube 302 and the second tube 303 are manufactured respectively and welded as a whole (i.e. the frame 3). As for which of the above-mentioned designs is adopted, it depends on practical demands. Furthermore, the control unit 31 is installed within the receiving space 301. The first connector 32 is disposed within the opening 306 and coupled to the control unit 31. In this embodiment, the first connector 32 is coupled to the control unit 31 by a cable (not shown in figures), but the present invention is not limited thereto. The battery module 33 is detachably installed in the installed space 305 via the exit opening 307. The second connector 34 is disposed on the battery module 33 and corresponds to the first connector 32. The connector base 35 covers the opening 306, and the first connector 32 is disposed on the connector base 35. Accordingly, the first connector 32 can be installed within the opening 306. The controller base 39 is connected to the connector base 35, and the control unit 31 is fixed on the controller base 39. Accordingly, when the connector base 35 is installed on a periphery of the opening 306, the controller base 39 is capable of fixing the control unit 31 within the receiving space 301. In this embodiment, the controller base 39 is screwed to the connector base 35, the control unit 31 is screwed to the controller base 39 as well, but the present invention is not limited thereto.

In this embodiment, the frame 3 is a substantially Y-shaped structure, and the first tube 302 and the second tube 303 are two branches of the Y-shaped structure. Furthermore, the first tube 302 has a front end 3020 and a rear end 3022. The rear end 3022 is for connecting the seat tube 5. The first combining member 40 is disposed on a side of the first tube 302 facing the second tube 303. The second combining member 41 is disposed on the battery module 33 and corresponds to the first combining member 40. The second combining member 41 mates with the first combining member 40 in a slidable manner, such that the battery module 33 moves relative to the first tube 302 along a front-to-rear movement path X. In this embodiment, the first combining member 40 and the second combining member 41 are a pair of sliding mechanism. For example, the first combining member 40 is a sliding track, and the second combining member 41 is a sliding block. The sliding block (i.e. the second combining member 41) is slidably engaged with the sliding track (i.e. the first combining member 40). Furthermore, the sliding track (i.e. the first combining member 40) is a linear sliding track, that is, the linear sliding block (i.e. the first combining member 40) guides the battery module 33 to slide along a linear path.

As shown in FIG. 2 to FIG. 5, the holding member 37 is disposed on the second tube 303. When the battery module 33 is installed into the installed space 305 via the exit opening 307, the holding member 37 is used for holding the battery module 33 for the battery module 33 to be stably installed in the installed space 305. It should be noticed that the holding member 37 has a cushion pad 371, which is made of elastic material, such as rubber. When the holding member 37 holds the battery module 33, the cushion pad 371 resiliently abuts against a lower surface of the battery module 33, such that the battery module 33 firmly abuts against the holding member 37 for facilitating the holding member 37 to fix the battery module 33. In other words, the cushion pad 371 of the holding member 37 of the present invention is capable of resiliently abutting against the battery module 33 for holding the battery module 33 and preventing the battery module 33 from being scratched during installed process. In this embodiment, the holding member 37 has two cushion pads 371. An amount of the cushion pad 371 of the present invention is not limited to those illustrated in figures in this embodiment. For example, the holding member 37 can include only one cushion pad 371. In other words, structures that the holding member 37 includes at least one cushion pad 371 are within the scope of the present invention.

In addition, the first connecting member 36 combines with the first tube 302 and is for fixing the first combining member 40 on the first tube 302. The second connecting member 38 combines with the second tube 303 and is for fixing the holding member 37 on the second tube 303. In this embodiment, the frame body 30, the first tube 302 and the second tube 303 of the frame 3 are made of carbon fiber material. In practical application, the carbon fiber material is brittle. The frame 3 made of carbon fiber material tends to crack as being screwed. Therefore, in practical application, the first connecting member 36 and the second connecting member 38 made of metal material can be respectively combined with the first tube 302 and the second tube 303 made of carbon fiber material in advance. Then, the first combining member 40 and the holding member 37 are screwed to the first connecting member 36 and the second connecting member 38. In such a manner, the first combining member 40 and the holding member 37 can be successfully secured to the first tube 302 and the second tube 303 made of carbon fiber material.

In this embodiment, the first connecting member 36 is further for connecting the connector base 35 and the first combining member 40, and the second connecting member 38 is further for connecting the connector base 35 and the holding member 37. Accordingly, the first combining member 40, the connector base 35 and the holding member 37 can be combined as a whole by the first connecting member 36 and the second connecting member 38, so as to enhance connectivity among the first combining member 40, the connector base 35 and the holding member 37 and further to increase structural stiffness of the first combining member 40, the connector base 35 and the holding member 37.

As shown in FIG. 2 to FIG. 5, a locking hole 401 is formed on the first combining member 40, and the battery module 33 has a locking device 331 which includes a pin 332 and a key slot 333. The pin 332 is retractable from an upper surface of the battery module 33. When the battery module 33 is contained in the installed space 305, a key (not shown in figures) corresponding to the key slot 333 is utilized for inserting into the key slot 333, so as to activate the pin 332 to stretch out of the upper surface of the battery module 33. Accordingly, the pin 332 engages with the locking hole 401, so as to lock the battery module 33. In other words, the lock device 331 selectively engages with the locking hole 401 when the battery module 33 is installed in the installed space 305, so as to lock the battery module 33 on the frame body 30. In other words, a first locking device (i.e. the locking hole 401) is coupled to the frame body 30, and a second locking device (i.e. the locking device 331) is coupled to the battery module 33. When the battery module 33 is installed in the installed space 305, the first locking device is capable of engaging with the second locking device, so as to lock the battery module 33 on the frame body 30.

Figure 6:
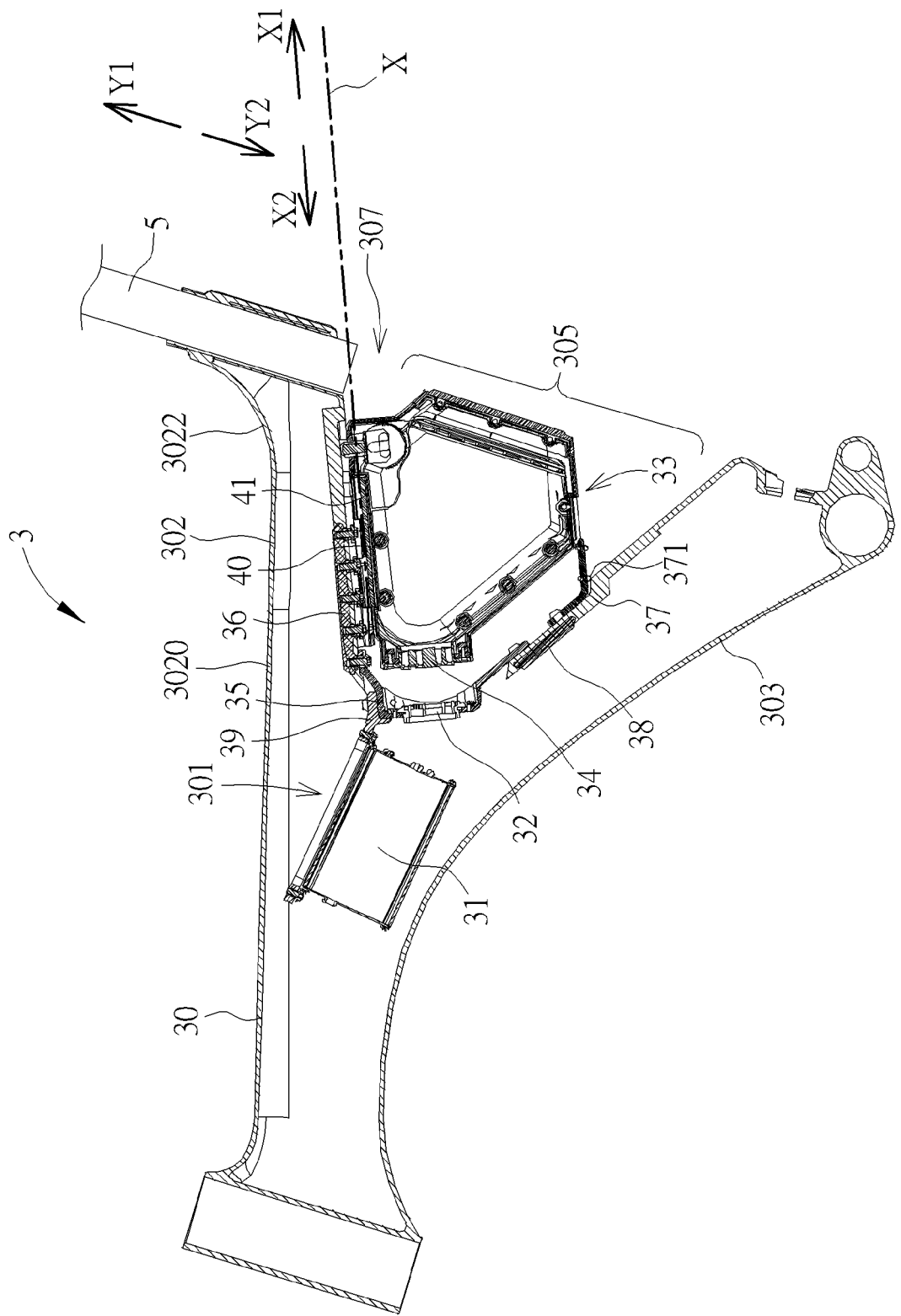
FIG. 6 and FIG. 7 are sectional diagrams of the frame in different statuses according to the embodiment of the present invention.
Figure 7:
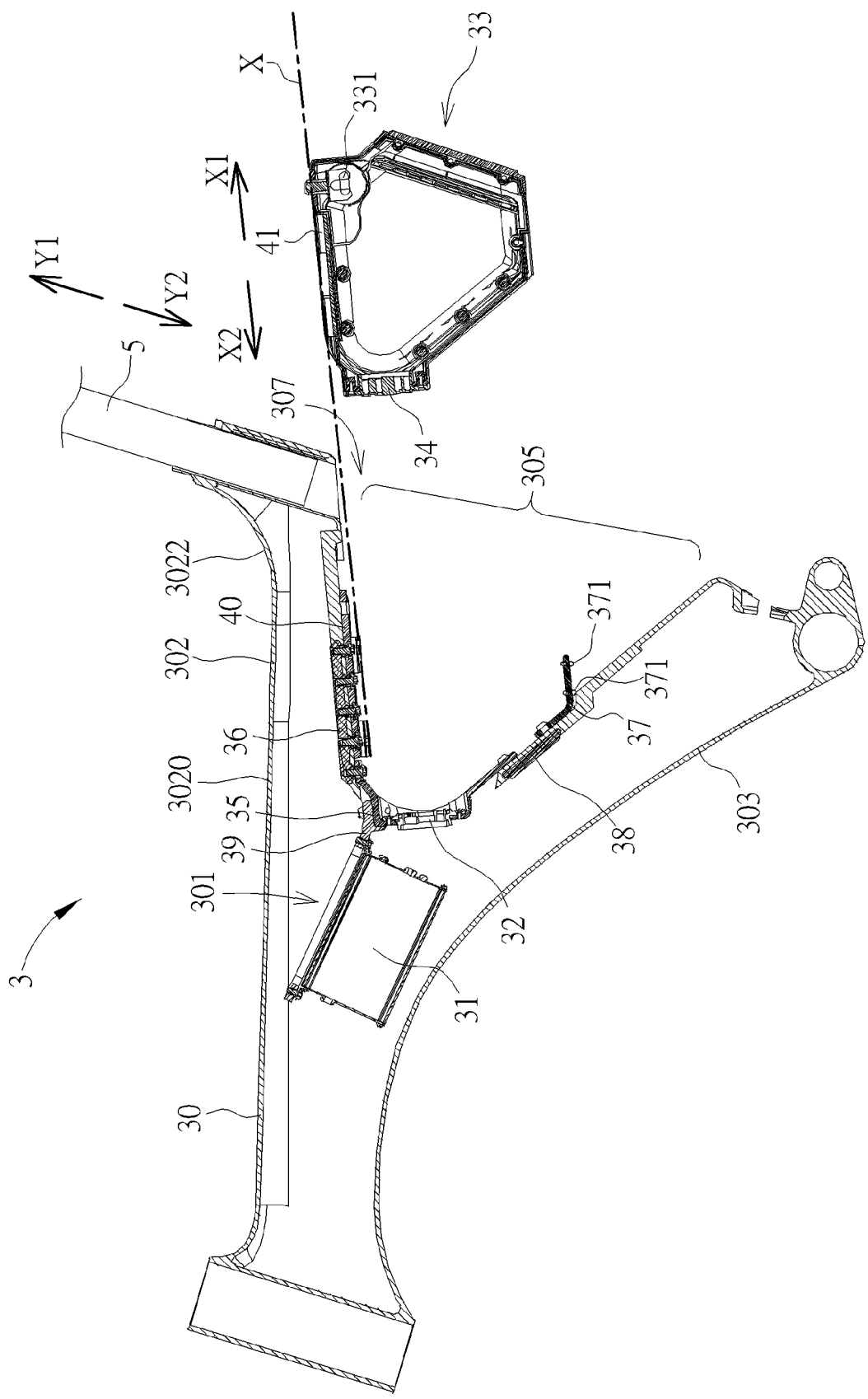

Please refer to FIG. 5 to FIG. 7. FIG. 6 and FIG. 7 are sectional diagrams of the frame 3 in different statuses according to the embodiment of the present invention. As shown in FIG. 5 to FIG. 7, when the battery module 33 is desired to be detached from the frame body 30, the seat tube 5 is moved from a closed position shown in FIG. 5 to an open position shown in FIG. 6 along a direction from the second tube 303 toward the first tube 302 (i.e. the direction Y1). When the seat tube 5 is moved to the open position shown in FIG. 6, the seat tube 5 does not surround the installed space 305, i.e. the seat tube 5 no longer occupies the exit opening 307 on a side of the installed space 305, so as to provide the battery module 33 with a space for detaching. Afterwards, the battery module 33 is pushed on the front-to-rear movement path X from an end of the front-to-rear movement path X shown in FIG. 5 to a start of the front-to-rear movement path X shown in FIG. 6 along a direction from the front end 3020 toward the rear end 3022 (i.e. a direction X1).

When the battery module 33 is moved to the start of the front-to-rear movement path X shown in FIG. 6, the second combining member 41 (i.e. the sliding block) of the battery module 33 is capable of separating from the first combining member 40 (i.e. the sliding track) of the first tube 302. Accordingly, the battery module 33 can be detached from the frame body 30 along a direction perpendicular to the direction X1 and the direction Y1 (i.e. a direction perpendicular to the sheet paper). Furthermore, the battery module 33 can sustain to be moved along the direction from the front end 3020 toward rear end 3022 (i.e. the direction X1), so as to move the battery module 33 from the start of the front-to-rear movement path X shown in FIG. 6 to a separating position shown in FIG. 7. In such a manner, the battery module 33 completely leaves from the installed space 305, such that the battery module 33 is capable of being detached from the frame body 30. In summary, when the seat 5 moves along a direction Y1 from the second tube 303 toward the first tube 302 to the open position, the exit opening 307 is formed on a side of the installed space 305 so that the battery module 33 is capable of being detached from the exit opening 307.

On the other hand, when the battery module 33 is desired to be installed in the installed space 305, the seat tube 5 needs to be moved to the open position shown in FIG. 6 as well for providing the battery module 33 with the space for installation. Then, the battery module 33 is pushed on the front-to-rear movement path X from the separating position shown in FIG. 7 to the end of the front-to-rear movement path X shown in FIG. 5 via the start of the front-to-rear movement path X shown in FIG. 6 along the direction from the rear end 3022 toward front end 3020 (i.e. the direction X2). Meanwhile, the battery module 33 completely enters in the installed space 305 for enabling the second connector 34 of the battery module 33 to be engaged with the first connector 32. In such a manner, the battery module 33 is electrically coupled to the control unit 31 for providing the pedelec 3000 with the power required during proceeding.

It should be noticed that when the battery module 33 is moved to the end of the front-to-rear movement path X along the direction from the rear end 3022 toward the front end 3020, the cushion pad 371 is further used for reducing impact between the battery module 33 and the frame body 30. Furthermore, when the battery module 33 is contained in the installed space 305, the seat tube 5 can be moved along a direction from the first tube 302 toward the second tube 303 (i.e. a direction Y2) for adjusting a height of the seat tube 5. It should be noticed that when seat tube 5 is moved to the closed position shown in FIG. 5, the seat tube 5, the first tube 302 and the second tube 303 cooperatively surround the installed space 305. In other words, when the seat tube 5 moves along the direction Y2 from the first tube 302 toward the second tube 303 to the closed position, the exit opening 307 is blocked by the seat tube 5 such that the battery module 33 is unable to be detached through the exit opening 307.

It should be noticed that a height of the lower surface of the first tube 302 gradually decreases along the direction from the rear end 3022 toward the front end 3020 (i.e. the direction X2), that is, in this embodiment, a distance between the lower surface of the first tube 302 and the upper surface of the second tube 303 gradually increases along the direction from the rear end 3022 toward the front end 3020 (i.e. the direction X2). In such a manner, the first combining member 40 installed on the lower surface of the first tube 302 is inclined by a tilted angle, such that the battery module 33 is driven by a battery weight to be inclined to the installed space 305. In other words, the first combining member 40 is inclined by a tilted angle and the rear end 3022 is higher than the front end 3020, such that the weight of the battery module 33 assists to move the battery module 33 toward the installed space 305. Furthermore, as shown in FIG. 5 to FIG. 7, the battery module 33 has a triangular casing. A front edge of the triangular casing has a first contour, and the lower surface of the first tube 302 and the upper surface of the second tube 303 form a second contour. In practical application, the first contour matches with the second contour, such that the triangular casing of the battery module 33 conjugates with the lower surface of the first tube 302 and the upper surface of the second tube 303 when the battery module 33 achieves the position shown in FIG. 5. Accordingly, the second connector 34 of the battery module 33 is capable of successfully being engaged with the first connector 32.

Compared to the prior art, the installed space formed between the first tube and the second tube is utilized for containing the battery module, and the control unit is disposed within the receiving space in the frame body. Thus, when the battery module is installed on the frame body, the battery module does not affect the appearance of the pedelec. Furthermore, the first combining member and the second combining member of the present invention are utilized for installing the battery module onto the frame body in a detachable manner. Thus, when the battery module is not in use, the battery module is capable of being detached from the pedelec for enhance containing convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame adapted to a pedelec with a rear wheel and a saddle member, comprising:
   a frame body with a receiving space formed therein, the frame body comprising a first tube coupled to the saddle member, the first tube having a front end and a rear end, and a second tube coupled to the rear wheel, the first tube being combined with the second tube at a conjunction, wherein an installed space is defined between the first tube and the second tube, and an opening being formed on the conjunction, and the receiving space communicating with the installed space through the opening;
   a control unit disposed within the receiving space;
   a first connector disposed within the opening and coupled to the control unit;
   a battery module detachably installed in the installed space and capable of moving relative to the first tube along a front-to-rear movement path; and
   a second connector disposed on the battery module and corresponding to the first connector,
   wherein when the battery module is installed in the installed space, the second connector engaged with the first connector such that the battery module is electrically coupled to the control unit;
   a seat tube movably installed on the first tube, and the saddle member being disposed on a top end of the seat tube;
   wherein when the seat tube moves higher to an open position, and the battery module simultaneously moves along the front-to-rear movement path from the front end toward the rear end, the battery module detaches from the installed space;
   when the seat tube moves lower to a close position, the front-to-rear movement path is blocked by the seat tube, so that the battery module is unable to be detached from the installed space.

2. The frame of claim 1, wherein the rear end is for coupling the saddle member, and the frame further comprises:
   a first combining member disposed on a side of the first tube facing the second tube; and
   a second combining member disposed on the battery module and corresponding to the first combining member, the second combining member mating with the first combining member in a slidable manner, so as to guide the battery module to move toward the installed space along a direction from the rear end toward the front end, or to guide the battery module to move away from the installed space along a direction from the front end toward the rear end.

3. The frame of claim 2, wherein the first combining member is a sliding track, the second combining member is a sliding block, and the sliding block is slidably engaged with the sliding track.

4. The frame of claim 1, further comprising:
   a cushion pad disposed on the second tube, and the cushion pad resiliently abutting against the battery module when the battery module is installed within the installed space.

5. The frame of claim 2, wherein a locking hole is formed on the first combining member, the battery module has a locking device, and the locking device selectively engages with the locking hole when the battery module is installed in the installed space, so as to lock the battery module on the frame body.

6. A frame adapted to a pedelec, comprising:
   a frame body being a substantially Y-shaped structure, a receiving space being formed within the frame body, the frame body comprising an opening, a first tube and a second tube, wherein the first tube is combined with the second tube at a conjunction, the first tube extends above the second tube, an installed space is defined between a lower surface of the first tube and an upper surface of the second tube, and the receiving space communicating with the installed space through the opening;
   a control unit disposed within the receiving space;
   a first connector disposed within the opening and coupled to the control unit;
   a battery module detachably installed in the installed space; and
   a second connector disposed on the battery module and corresponding to the first connector,
   wherein when the battery module is installed in the installed space, the second connector engaged with the first connector, such that the battery module is electrically coupled to the control unit;
   wherein the battery module comprises a triangular casing, a front edge of the triangular casing has a first contour, the lower surface of the first tube and the upper surface of the second tube form a second contour, and the first contour matches with the second contour.

7. The frame of claim 6, further comprising:
   a holding member disposed on the second tube and protruding from the upper surface of the second tube, the holding member abutting against the battery module for holding the battery module when the battery module is installed in the installed space.

8. The frame of claim 7, wherein the holding member has a cushion pad for resiliently abutting against the battery module when the holding member holds the battery module.

9. The frame of claim 6, wherein the first tube has a front end and a rear end, and the frame further comprises:
   a first combining member disposed on the lower surface of the first tube; and
   a second combining member disposed on the battery module and corresponding to the first combining member, the second combining member mating with the first combining member, such that the battery module moves relative to the first tube along a front-to-rear movement path;
   when the battery module moves along a direction from the rear end toward the front end, the battery module being installed in the installed space;
   when the battery module moves along a direction from the front end toward the rear end, the battery module detaching from the installed space.

10. The frame of claim 9, wherein a locking hole is formed on the first combining member, the battery module has a locking device, and the locking device selectively engages with the locking hole when the battery module is installed in the installed space, so as to lock the battery module on the frame body.

11. The frame of claim 9, wherein the battery module has a battery front end, the first connector is disposed near the conjunction, the second connector is disposed on the battery front end, the second connector is coupled with the first connector when the battery module moves to an end of the front-to-rear movement path along the direction from the rear end to the front end.

12. The frame of claim 9, wherein the first combining member and the second combining member are a pair of sliding mechanism for making the battery module slide below the lower surface of the first tube along the front-to-rear movement path.

13. The frame of claim 12, wherein the first combining member is inclined by a tilted angle and the rear end is higher than the front end, such that the weight of the battery module assists to move the battery module toward the installed space.

14. A frame adapted to a pedelec, comprising:
a frame body being a substantially Y-shaped structure, the frame body comprising a first tube and a second tube, wherein the first tube extends above the second tube, an installed space is defined between a lower surface of the first tube and an upper surface of the second tube, and the first tube has a front end and a rear end;
a first connector disposed on the frame body;
a battery module detachably installed in the installed space;
a second connector disposed on the battery module and corresponding to the first connector, the second connector being coupled to the first connector when the battery module is installed in the installed space;
a first combining member disposed on the lower surface of the first tube; and
a second combining member disposed on the battery module and corresponding to the first combining member, the second combining member mating with the first combining member, such that the battery module moves relative to the first tube along a front-to-rear movement path;
when the battery module moves along a direction from the rear end toward the front end, the battery module being installed in the installed space;
when the battery module moves along a direction from the front end toward the rear end, the battery module detaching from the installed space.

15. The frame of claim 14, wherein the first tube is combined with the second tube at a conjunction, battery module has a battery front end, the first connector is disposed near the conjunction, the second connector is disposed on the battery front end, the second connector is coupled with the first connector when the battery module moves to an end of the front-to-rear movement path along the direction from the rear end to the front end.

16. The frame of claim 14, wherein the first combining member and the second combining member are a pair of sliding mechanism for making the battery module slide below the lower surface of the first tube along the front-to-rear movement path.

17. The frame of claim 16, wherein the first combining member is inclined by a tilted angle and the rear end is higher than the front end, such that the weight of the battery module assists to move the battery module toward the installed space.

18. The frame of claim 14, further comprising:
a holding member disposed on the second tube and protruding from the upper surface of the second tube, the holding member abutting against the battery module for holding the battery module when the battery module is installed in the installed space.

19. The frame of claim 18, wherein the holding member has a cushion pad, the cushion pad reduces impact between the battery module and the frame body when the battery module moves to an end of the front-to-rear movement path along the direction from the rear end to the front end, and the cushion pad resiliently abutting against the battery module when the holding member holds the battery module.

20. The frame of claim 14, wherein a first locking device is coupled to the frame body, a second locking device is coupled to the battery module, and the first locking device is capable of engaging with the second locking device when the battery module is installed in the installed space, so as to lock the battery module on the frame body.

21. The frame of claim 14, wherein the battery module comprises a triangular casing, a front edge of the triangular casing has a first contour, the lower surface of the first tube and the upper surface of the second tube form a second contour, and the first contour matches with the second contour.

* * * * *